(12) United States Patent
Kim et al.

(10) Patent No.: US 8,537,921 B2
(45) Date of Patent: Sep. 17, 2013

(54) APPARATUSES AND METHODS FOR TRANSMISSION AND RECEPTION IN A CODEBOOK BASED CLOSED-LOOP (CL)-MULTIPLE INPUT MULTIPLE OUTPUT (MIMO) SYSTEM

(75) Inventors: Yong-Seok Kim, Hwaseong-si (KR); Keun-Chul Hwang, Yongin-si (KR); In-Seok Hwang, Seoul (KR); June Moon, Seoul (KR); Soon-Young Yoon, Seoul (KR); Won-Il Roh, Yongin-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1181 days.

(21) Appl. No.: 12/430,035

(22) Filed: Apr. 24, 2009

(65) Prior Publication Data

US 2009/0274227 A1 Nov. 5, 2009

(30) Foreign Application Priority Data

Apr. 30, 2008 (KR) ........................ 10-2008-0040425

(51) Int. Cl.
*H04L 1/02* (2006.01)
(52) U.S. Cl.
USPC .............................. 375/267; 375/260; 706/24

(58) Field of Classification Search
USPC ..................... 375/267, 260; 706/24
See application file for complete search history.

(56) References Cited

U.S. PATENT DOCUMENTS

| | | | |
|---|---|---|---|
| 2007/0155336 A1* | 7/2007 | Nam et al. ...................... | 455/69 |
| 2008/0043865 A1* | 2/2008 | Kim et al. ...................... | 375/260 |
| 2008/0225962 A1* | 9/2008 | Zhou et al. ................... | 375/260 |
| 2008/0285667 A1* | 11/2008 | Mondal et al. ............... | 375/260 |
| 2008/0304464 A1* | 12/2008 | Borkar et al. ................. | 370/342 |
| 2009/0046801 A1* | 2/2009 | Pan et al. ...................... | 375/267 |

* cited by examiner

*Primary Examiner* — Leila Malek
(74) *Attorney, Agent, or Firm* — Jefferson IP Law, LLP

(57) ABSTRACT

Apparatuses and methods for transmission and reception in a Closed-Loop (CL)-Multiple Input Multiple Output (MIMO) system are provided. A codebook generation method includes determining weight vectors $v_i$ (i=1, . . . , 2L) for a codebook V(4, 1, L), where $N_t$ of a codebook $V(N_t, s, L)$ denotes a number of antennas, s denotes a number of streams, and L denotes a number of codebook index bits, determining a unitary matrix $T_i$ using an i-th vector $v_i$ of the codebook V(4, 1, L), and determining an i-th matrix of the codebook V(4, 2, L) by selecting a first column of the unitary matrix $T_i$ as a first column of a weight matrix and selecting a column selected from other columns excluding the first column of the unitary matrix $T_i$ in a particular pattern, as a second column of the weight matrix.

15 Claims, 7 Drawing Sheets

APPARATUSES AND METHODS FOR TRANSMISSION AND RECEPTION IN A CODEBOOK BASED CLOSED-LOOP (CL)-MULTIPLE INPUT MULTIPLE OUTPUT (MIMO) SYSTEM

PRIORITY

This application claims the benefit under 35 U.S.C. §119(a) of a Korean patent application filed in the Korean Intellectual Property Office on Apr. 30, 2008 and assigned Serial No. 10-2008-0040425, the entire disclosure of which is hereby incorporated by reference.

BACKGROUND OF THE INVENTION

1. Field of the Invention

The present invention relates generally to apparatuses and methods for transmission and reception in a codebook based Closed-Loop (CL) Multiple Input Multiple Output (MIMO) system. More particularly, the present invention relates to apparatuses and methods for generating an optimum codebook and communicating using the optimum codebook.

2. Description of the Related Art

In response to increasing demands for high-speed and high-quality data transmission, a Multiple Input Multiple Output (MIMO) technique using a plurality of transmit antennas and receive antennas is drawing a lot of attention as one solution for satisfying those demands. The MIMO technique conducts a communication using a plurality of channels by means of multiple antennas, to thus drastically enhance a channel capacity, compared to a single-antenna system. For example, when a transmitter and a receiver use M-ary transmit antennas and M-ary receive antennas, channels between the antennas are independent of each other, and bandwidth and total transmit power are fixed, the average channel capacity increases by M times the single antenna.

The MIMO technique can be classified into an Open-Loop (OL)-MIMO and a Closed-Loop (CL)-MIMO based on feedback. According to the CL-MIMO, the transmitter receives channel information fed back from the receiver. There are two feedback methods. First, the receiver quantizes and feeds back a channel coefficient value to the transmitter. This method features a quite accurate value relative to the channel of the transmitter but suffers considerable feedback overhead. Secondly, the receiver refers to a codebook with an estimated channel and feeds back the retrieved codebook index to the transmitter, which can reduce the feedback overhead.

When the codebook is used in the CL-MIMO system, factors affecting the system performance include the codebook design, the codebook type, the codebook size and the like. Thus, in the codebook based MIMO system, it is necessary to design an optimum codebook by properly setting causes according to a purpose (e.g., channel capacity increase, average error rate reduction, codebook search complexity reduction and the like).

Therefore a need exists for an apparatus and method for generating an optimum codebook in a codebook based CL-MIMO system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for generating an optimum codebook in a codebook based Multiple Input Multiple Output (MIMO) system.

Another aspect of the present invention is to provide an apparatus and a method for communication using an optimum codebook in a codebook based MIMO system.

Yet another aspect of the present invention is to provide an apparatus and a method for reducing computations in a codebook search in a codebook based MIMO system.

Still another aspect of the present invention is to provide an apparatus and a method for designing a codebook $V(4, 2, 6)$ and a codebook $V(4, 2, 3)$ in a codebook based MIMO system.

A further aspect of the present invention is to provide an apparatus and a method for generating a first column of a rank 2 codebook matrix with a rank 1 codebook vector in a codebook based MIMO system.

In accordance with an aspect of the present invention, a method for generating a codebook in a Closed-Loop (CL)-MIMO system is provided. The method includes determining weight vectors $v_i$ ($i=1, \ldots, 2L$) for a codebook $V(4, 1, L)$, where $N_t$ of a codebook $V(N_t, s, L)$ denotes a number of antennas, s denotes a number of streams, and L denotes a number of codebook index bits, determining a unitary matrix $T_i$ using an i-th vector $v_i$ of the codebook $V(4, 1, L)$, and determining an i-th matrix of the codebook $V(4, 2, L)$ by selecting a first column of the unitary matrix $T_i$ as a first column of a weight matrix and selecting a column selected from other columns excluding the first column of the unitary matrix $T_i$ in a particular pattern, as a second column of the weight matrix.

In accordance with another aspect of the present invention, an apparatus for a transmission in a codebook based CL-MIMO system is provided. The apparatus includes a feedback receiver for receiving a codebook index from a receiver, a weight generator for searching a codebook with the codebook index and generating a beamforming weight corresponding to the codebook index, a beamformer for generating data beamformed by multiplying transmit data by the beamforming weight, and a transmitter for transmitting the data beamformed at the beamformer over a plurality of antennas, wherein the codebook comprises weight vectors for a codebook $V(4, 1, L)$ and weight matrices for a codebook $V(4, 2, L)$, where $N_t$ of a codebook $V(N_t, s, L)$ denotes a number of antennas, s denotes a number of streams, L denotes a number of codebook index bits, and $V(4, 2, L)=H(V(4, 1, L))_{1:2}$, where $H(v)$ denotes a function of generating a unitary matrix with an input vector v and a subscript of $H(\ )$ indicates a column selection pattern for a result of the function.

In accordance with yet another aspect of the present invention, an apparatus for a reception in a codebook based CL-MIMO system is provided. The apparatus includes a channel estimator for estimating a channel between a transmitting end and a receiving end, a searcher for searching a codebook using a channel estimate value output from the channel estimator and issuing the searched codebook index, and a feedback transmitter for generating a feedback signal with the codebook index output from the searcher and transmitting the feedback signal to a transmitter, wherein the codebook comprises weight vectors for a codebook $V(4, 1, L)$ and weight matrices for a codebook $V(4, 2, L)$, where $N_t$ of a codebook $V(N_t, s, L)$ denotes a number of antennas, s denotes a number of streams, and $V(4, 2, L)=H(V(4, 1, L))_{1:2}$ where $H(v)$ denotes a function of generating a unitary matrix with an input vector v and a subscript of $H(\ )$ indicates a column selection pattern for a result of the function.

In accordance with still another aspect of the present invention, an operating method of a transmitter in a codebook based CL-MIMO system is provided. The operating method includes receiving a codebook index from a receiver, searching a codebook with the codebook index, generating a beamforming weight corresponding to the searched codebook index, generating data beamformed by multiplying transmit data by the beamforming weight, and transmitting the data beamformed at the beamformer over a plurality of antennas, wherein the codebook comprises weight vectors for a codebook V(4, 1, L) and weight matrices for a codebook V(4, 2, L), where $N_t$ of a codebook $V(N_t, s, L)$ denotes a number of antennas, s denotes a number of streams, and $V(4, 2, L)=H(V(4, 1, L))_{1:2}$, where H(v) denotes a function of generating a unitary matrix with an input vector v and a subscript of H( ) indicates a column selection pattern for a result of the function.

In accordance with a further aspect of the present invention, an operating method of a receiver in a codebook based CL-MIMO system is provided. The operating method includes estimating a channel between a transmitting end and a receiving end, determining a codebook index by searching a codebook using the channel estimate value, generating a feedback signal with the determined codebook index, and transmitting the feedback signal to a transmitter, wherein the codebook comprises weight vectors for a codebook V(4, 1, L) and weight matrices for V(4, 2, L), where $N_t$ of a codebook $V(N_t, s, L)$ denotes a number of antennas, s denotes a number of streams, and $V(4, 2, L)=H(V(4, 1, L))_{1:2}$, where H(v) denotes a function of generating a unitary matrix with an input vector v and a subscript of H( ) indicates a column selection pattern for a result of the function.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
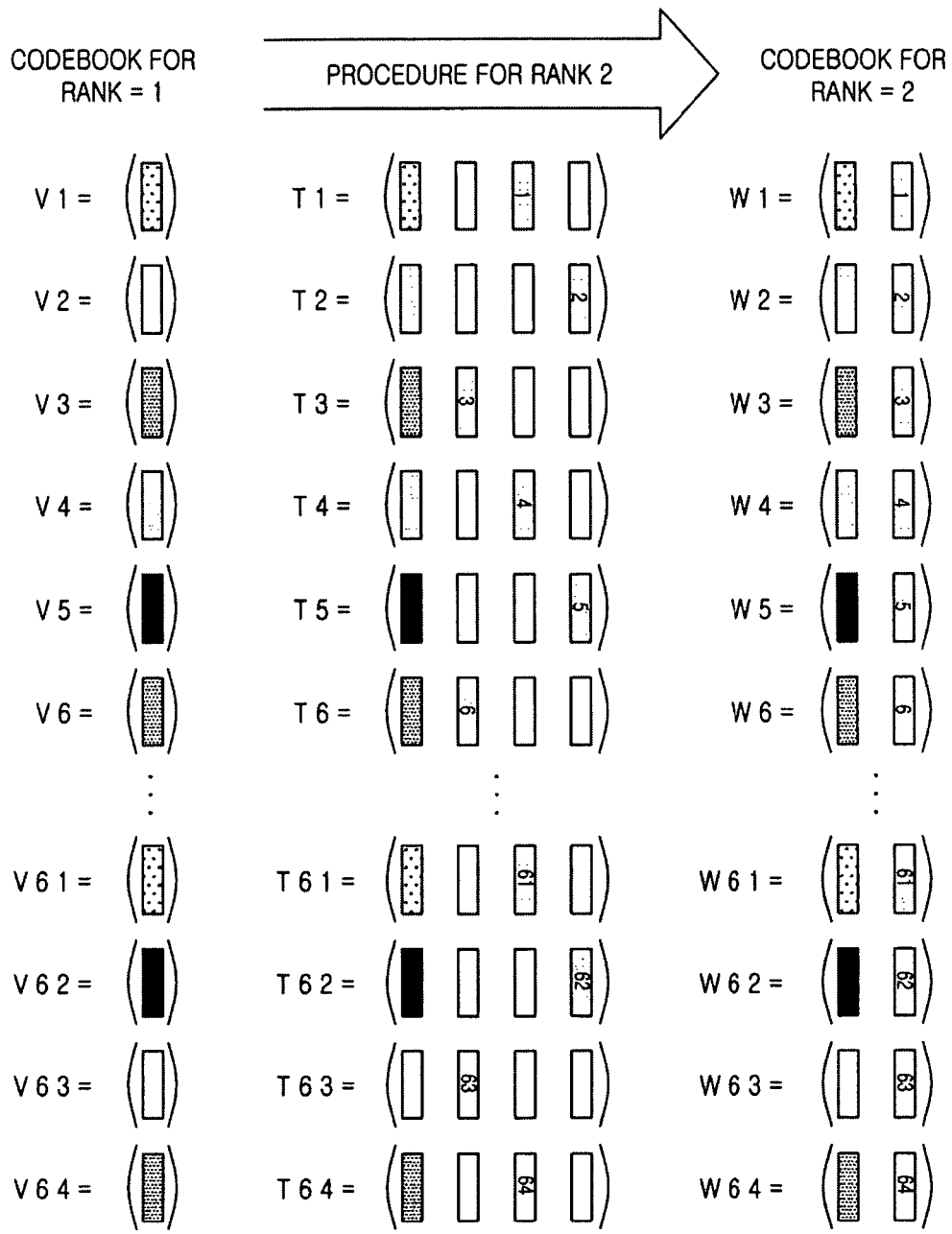
FIG. 1 illustrates a codebook generation rule according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for designing an optimum codebook in a codebook based Closed-Loop (CL)-Multiple Input Multiple Output (MIMO) system, and a system (a transmitter and a receiver) which communicates using the optimum codebook.

The following description is made in context of an Orthogonal Frequency Division Multiplexing/Orthogonal Frequency Division Multiple Access (OFDMA) Broadband Wireless Access (BWA) communication system. However, exemplary embodiments of the present invention are not limited to an OFDM-based system. Thus, any other codebook based access systems (e.g., Code Division Multiple Access (CDMA) system) may be applicable.

While a method for designing a codebook V(4, 1, 6) and a codebook V(4, 2, 6) is illustrated by way of example, exemplary embodiments of the present invention is applicable according to a number of transmit antennas, a number of streams, and a number of codebook index bits. The codebook may be represented as $V(N_t, S, L)$ according to the number of transmit antennas $N_t$, the number of streams S, and the number of codebook index bits L.

The codebook V(4, 1, 6) for a rank 1 codebook may be determined based on Equation (1). Since the number of the codebook index bits L is 6, the total number of vectors of the codebooks is 64 (v1~v64). Each codebook vector (or weight vector) is [4×1] in size.

$$v_i = \begin{cases} \frac{1}{\sqrt{N_i}} \left[1 e^{j\frac{2\pi}{2N_t}} \ldots e^{j\frac{2\pi}{2N_t}(N_t-1)}\right]^T, & \text{for } i=1 \\ \tilde{v}_i \cdot e^{-j\phi_i}, & \text{for } i=2,\ldots,2^L \end{cases} \quad (1)$$

where, $.\tilde{v} = H(s)Q^{i-1}(u)H^H(s)v_1$, for $i=2,\ldots,2^L$ $.Q^i(u) = \text{diag}\left(e^{j\frac{2\pi}{2^L} \cdot u_1 \cdot i} \ldots e^{j\frac{2\pi}{2^L} \cdot u_{N_t} \cdot i}\right), u = [u_1 \ u_2 \ \ldots \ u_{N_t}]$ $.\phi_i$: the phase of the first entry of $v_i$ $.H(v) = \begin{cases} I, & v = e_1 \\ I - pvv^H, & \text{otherwise} \end{cases}$ -continued where, $w = v - e_1, e_1 = [1 \quad 0 \quad \ldots \quad 0], p = \dfrac{2}{\|w^H w\|}$ if $Nt = 4 \, \& L = 6, u = [1 \quad 45 \quad 22 \quad 49]$ $s = \begin{bmatrix} 1.3954 - j0.0738 \\ 0.0206 + j0.4326 - \\ 0.1658 - j0.5445 \\ 0.5487 - j0.1599 \end{bmatrix}$ In Equation (1), I denotes an identity matrix, $(\;)^H$ denotes a conjugate transpose operation, and H(v) denotes a unitary matrix.

As expressed in Equation (1), the codebook V(4, 1, 6) may be generated using a Grassmannian subspace packing. Herein, it is known that the Grassmannian subspace packing features uniform division of a given space into a preset number of subspaces.

The codebook V(4, 2, 6) for a rank 2 codebook is generated based on Equation (2). Since the number of the codebook index bits is 6, the total number of the matrices of the codebook is 64 (W1~W64) and each codebook matrix (or each weight matrix) is [4×2] in size.

$W_i = [t_1 \quad t_{f(i)}]$ for $i = 1, \ldots, 2^L$ (2)

where, $.T_i = I - p w_i^H w_i = [t_1 \quad t_2 \quad t_3 \quad t_4]$ for $i = 1, \ldots, 2^L$ $.t_j$ is $N_t$ by 1 vector for $j = 1, \ldots, N_t$ $.1 = N_t$ by $N_t$ identity matrix $.w_i = v_i - e_1$ for $i = 1, \ldots, 2^L$ $.p = \dfrac{2}{\|w_i^H w_i\|}$ for $i = 1, \ldots, 2^L$ In Equation (2), a unitary matrix $T_i$ is produced using the weight vector $v_i$ of the rank 1 codebook. A first column of the i-th weight matrix $W_i$ is generated with the first column of the unitary matrix $T_i$, and a second column of the weight matrix $W_i$ is generated with a column selected based on a particular pattern from other columns (the second column, a third column, and a fourth column) excluding the first column of the unitary matrix $T_i$. Herein, the first column of the unitary matrix $T_i$ is generated with the weight vector $v_i$ of the rank 1 codebook. Thus, the first column of the weight matrix of the rank 2 codebook is generated with the weight vector $v_i$ of the rank 1 codebook.

The particular pattern may be various. For example, the particular pattern may be a round-robin pattern, which may be expressed as $f(i)=2+i \bmod(N_t-1)$. Using the round-robin, the codebook may be determined based on Equation (3).

$W_i = [t_1 \quad t_{(2+i \bmod(N_t-1))}]$ for $i = 1, \ldots, 2^L$ (3)

where, $.T_i = I - p w_i^H w_i = [t_1 \quad t_2 \quad t_3 \quad t_4]$ for $i = 1, \ldots, 2^L$ $.t_j$ is $N_t$ by 1 vector for $j = 1, \ldots, N_t$ $.1 = N_t$ by $N_t$ identity matrix $.w_i = v_i - e_1$ for $i = 1, \ldots, 2^L$ $.p = \dfrac{2}{\|w_i^H w_i\|}$ for $i = 1, \ldots, 2^L$ FIG. 1 illustrates a codebook generation rule according to an exemplary embodiment of the present invention. The codebook generation is based on Equation (3).

Referring to FIG. 1, unitary matrix T1 is determined using vector v1 of the rank 1 codebook and matrix W1 of the rank 2 codebook is determined by selecting the first column and the third column of the matrix T1. The first column of the unitary matrix T1 is generated with the vector v1 and thus the first column of the matrix W1 of the rank 2 codebook is generated with the vector v1. Matrix T2 is determined using vector v2 of the rank 1 codebook and matrix W2 of the rank 2 codebook is determined by selecting the first column and the fourth column of the matrix T2. Matrix T3 is determined using vector v3 of the rank 1 codebook and matrix W3 of the rank 2 codebook is determined by selecting the first column and the second column of the matrix T3.

Accordingly, vector $v_i$ is generated for the rank (or the stream) 1 codebook matrix and unitary matrix $T_i$ is generated using the vector $v_i$ of the rank 1 codebook. Next, when matrix $W_i$ for rank 2 codebook is generated, the first column of $W_i$ may be generated with the first column of the matrix $T_i$ and the second column of the matrix $W_i$ may be generated by selecting the second column, the third column and the fourth column of the matrix $T_i$ in the round-robin manner.

Alternatively, when the codebook (4, 2, 6) for the rank 2 codebook is generated, the second column of the matrix $W_i$ may be generated with a column of a particular order (e.g., the second column) of the matrix $T_i$ based on Equation (4), which may be expressed as f(i)=2.

Figure 2:
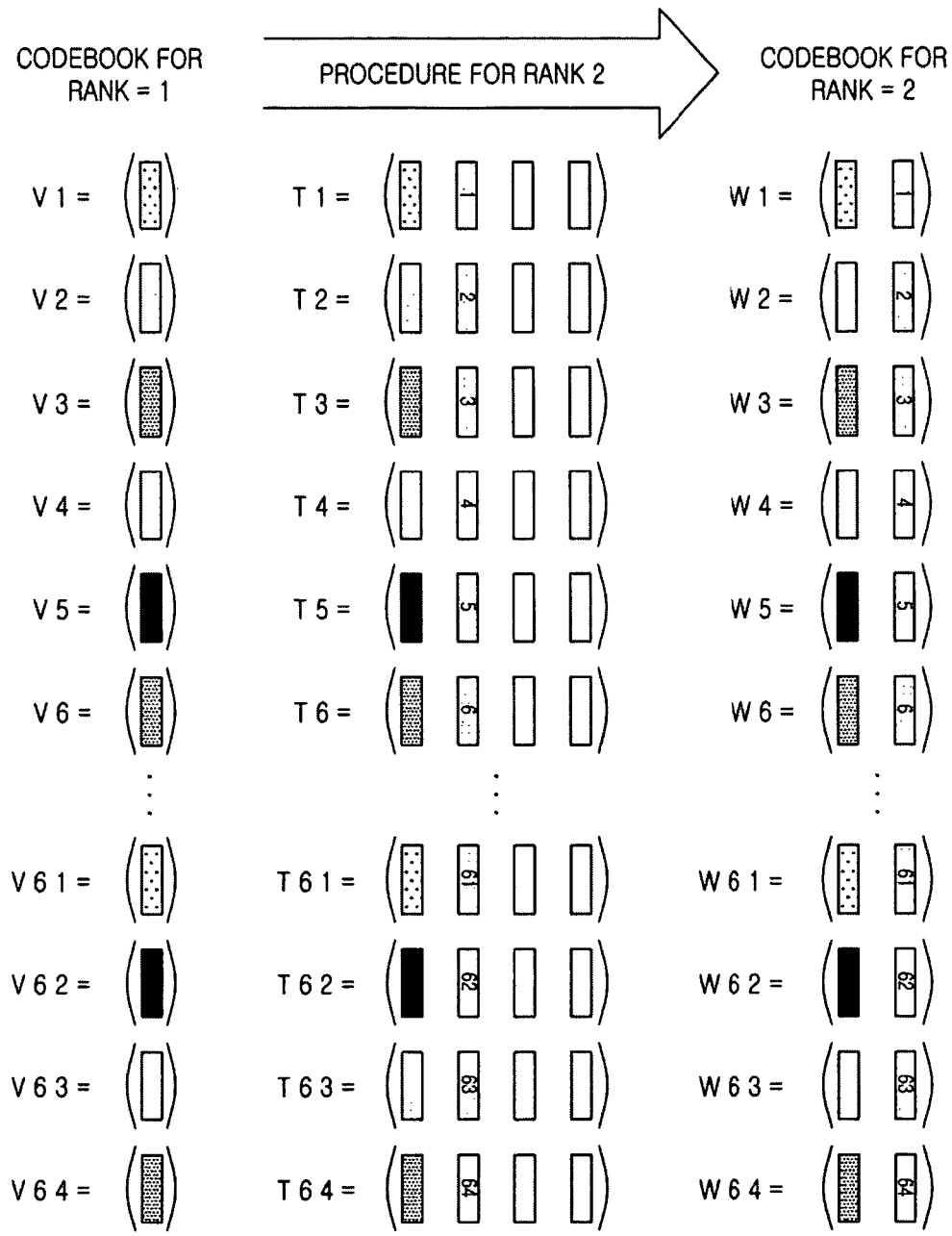
FIG. 2 illustrates a codebook generation rule according to an exemplary embodiment of the present invention.

$W_i = [t_1 \quad t_2]$ for $i = 1, \ldots, 2^L$ (4)

where, $.T_i = I - p w_i^H w_i = [t_1 \quad t_2 \quad t_3 \quad t_4]$ for $i = 1, \ldots, 2^L$ $.t_j$ is $N_t$ by 1 vector for $j = 1, \ldots, N_t$ $.1 = N_t$ by $N_t$ identity matrix $.w_i = v_i - e_1$ for $i = 1, \ldots, 2^L$ $.p = \dfrac{2}{\|w_i^H w_i\|}$ for $i = 1, \ldots, 2^L$ FIG. 2 illustrates a codebook generation rule according to an exemplary embodiment of the present invention. The codebook generation is based on Equation (4).

Referring to FIG. 2, unitary matrix T1 is generated using vector v1 of the rank 1 codebook and matrix W1 of the rank 2 codebook is generated by selecting the first column and the second column of the matrix T1. The first column of the unitary matrix T1 is generated with the vector v1. Thus, the first column of the matrix W1 of the rank 2 codebook is generated with the vector v1. Likewise, matrix T2 is generated using vector v2 of the rank 1 codebook and matrix W2 of the rank 2 codebook is generated by selecting the first column and the second column of the matrix T2. Matrix T3 is generated using vector v3 of the rank 1 codebook and matrix W3 of the rank 2 codebook is generated by selecting the first column and the second column of the matrix T3.

Accordingly, vector $v_i$ for the rank (or the stream) 1 is generated and unitary matrix $T_i$ is generated using the vector $v_i$ of the rank 1 codebook. Next, when matrix $W_i$ for the rank 2 codebook is generated, the first column of $W_i$ is generated with the first column of the matrix $T_i$ and the second column of the matrix $W_i$ is generated with the second column of $T_i$.

Using the codebook as generated above, computations in the codebook search at a receiver (a terminal) may be reduced.

1) Computation for the rank 1 codebook: (2 by 4)×(4 by 1)

$$H \cdot v_i = \begin{bmatrix} h_1 \\ h_2 \end{bmatrix} \cdot v_i = \begin{bmatrix} h_1 \cdot v_i \\ h_2 \cdot v_i \end{bmatrix}$$

2) Computation for the rank 2 codebook:

(2 by 4)×(4 by 2) → (2 by 4)×(4 by 1)

$$H \cdot W_i = \begin{bmatrix} h_1 \\ h_2 \end{bmatrix} \cdot [w_{i,1} \quad w_{i,2}] = \begin{bmatrix} h_1 \\ h_2 \end{bmatrix} \cdot [v_i \quad w_{i,2}] = \begin{bmatrix} h_1 v_i & h_1 w_{i,2} \\ h_2 v_i & h_2 w_{i,2} \end{bmatrix} =$$

$$\begin{bmatrix} H \cdot v_i & \begin{matrix} h_1 w_{i,2} \\ h_2 w_{i,2} \end{matrix} \end{bmatrix}$$

As mentioned above, since the first column of the rank 2 codebook utilizes the computation value for the rank 1 codebook as it is, the computations at the terminal may be greatly reduced.

Figure 3:
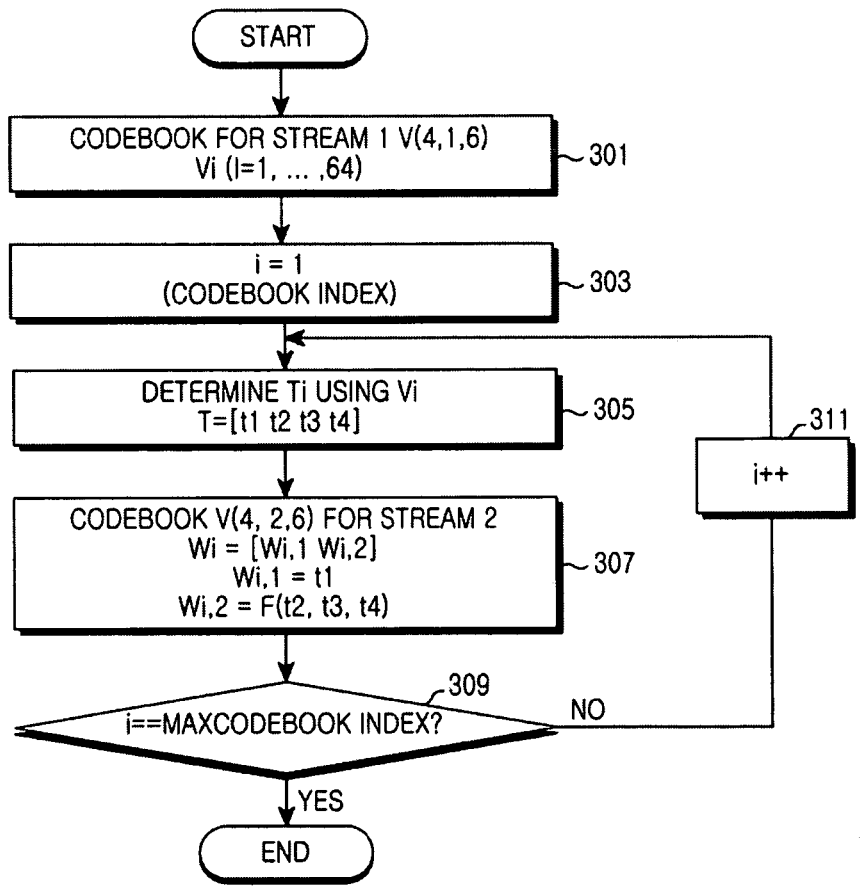
FIG. 3 is a flowchart illustrating a codebook generating process in a Closed-Loop (CL)-Multiple Input Multiple Output (MIMO) system according to an exemplary embodiment of the present invention.

FIG. 3 is a flowchart illustrating a codebook generating process in a CL-MIMO system according to an exemplary embodiment of the present invention.

In an exemplary implementation, it is assumed that the number of transmit antennas $N_t$ is 4, the number of the codebook index bits L is 6, and the codebooks for the rank 1 codebook and the rank 2 codebook are generated.

Referring to FIG. 3, in step 301, a processor generates the codebook V(4, 1, 6) for the rank 1 (or the stream 1) codebook. For example, the codebook V(4, 1, 6) may be generated according to the Grassmannian subspace packing based on Equation (1) and includes 64 vectors $v_i$ (i=1, . . . , 64) in total.

In step 303, the processor initializes the codebook index i to 1. In step 305, the processor determines the unitary matrix $T_i$ using the i-th codebook vector $v_i$ of the rank 1 codebook. The unitary matrix $T_i$ is 4×4 in size and computed based on Equation (2).

In step 307, the processor determines the i-th codebook matrix $W_i$ of the codebooks for the rank 2 codebook using the matrix $T_i$. The first column (or the first vector) of the matrix $W_i$ is generated with the first column of $T_i$ and the second column of $W_i$ is generated with the column selected from the other columns (the second column, the third column and the fourth column) excluding the first column of $T_i$ in the particular pattern. Function $f(t2,t3,t4)$ denotes a function of selecting any one of the second vector, the third vector, and the fourth vector of the matrix $T_i$. Accordingly, one vector may be selected at random or in a particular pattern. For example, one vector may be selected in the round-robin manner as expressed in Equation (3), or a vector (or a column) of a certain order may be selected as expressed in Equation (4).

In step 309, the processor verifies whether the codebook index i reaches a codebook index maximum value (maxCodebook index=64). That is, the processor examines whether the codebook is completed. When the codebook is completed, the processor finishes this process. When the codebook is not completed, the processor increases the codebook index i by 1 in step 311 and returns to step 305. Specifically, the processor determines 64 weight vectors for the rank 1 codebook and 64 weight matrixes for the rank 2 codebook.

A system using the codebook as determined in FIG. 3 is described below.

Figure 4:
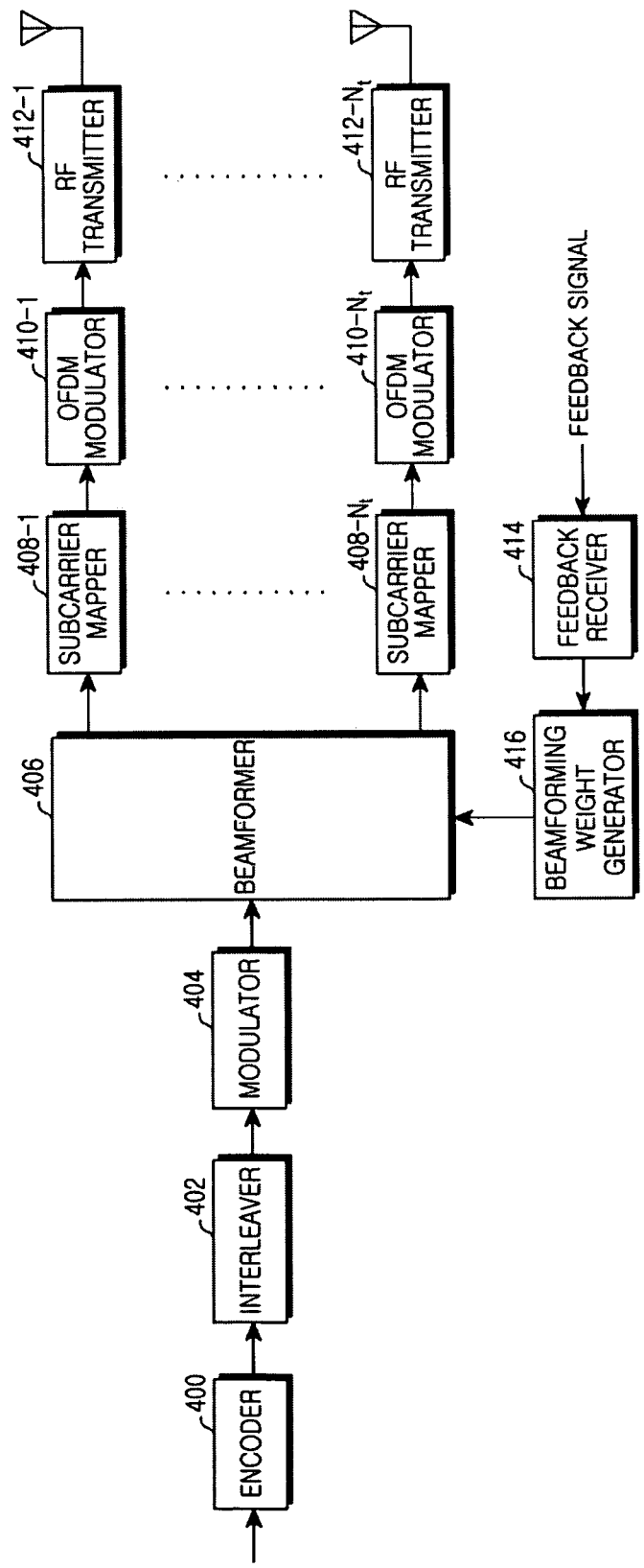
FIG. 4 is a block diagram illustrating a transmitter in a codebook based CL-MIMO system according to an exemplary embodiment of the present invention.

FIG. 4 is a block diagram illustrating a transmitter in a codebook based CL-MIMO system according to an exemplary embodiment of the present invention. The transmitter is a relative term and is assumed to be a base station.

Referring to FIG. 4, the transmitter includes an encoder 400, an interleaver 402, a modulator 404, a beamformer 406, a plurality of subcarrier mappers 408-1 through 408-$N_t$, a plurality of OFDM modulators 410-1 through 410-$N_t$, a plurality of Radio Frequency (RF) transmitters 412-1 through 412-$N_t$, a feedback receiver 414 and a beamforming weight generator 416.

The encoder 400 channel-encodes the transmit data. Herein, the encoder 400 may use a Convolutional Code (CC), a Turbo Code (TC), a Convolutional Turbo Code (CTC), a Low Density Parity Check (LDPC) code, and the like. The interleaver 402 interleaves the encoded data output from the encoder 400. The modulator 404 produces modulated symbols by modulating the data output from the interleaver 402. For example, the modulator 404 may adopt Quadrature Phase Shift Keying (QPSK), 16 Quadrature Amplitude Modulation (QAM) and 64 QAM. Herein, when a plurality of streams is serviced, the streams may be modulated at a same Modulation and Coding Scheme (MCS) level or at different MCS levels.

The feedback receiver 414 analyzes a message (or a channel signal) fed back from a receiver (a terminal). The feedback receiver 414 acquires the codebook index (including a rank index) from the feedback message and provides the codebook index to the beamforming weight generator 416. The beamforming weight generator 416 includes the codebook, searches the codebook with the codebook index fed back from the terminal, and issues a beamforming weight (a weight vector or a weight matrix) corresponding to the codebook index to the beamformer 406. Herein, it is assumed that the codebook includes the weights for the rank 1 codebook and the weights for the rank 2 codebook. The weight vectors for the rank 1 codebook may be generated using the Grassmannian subspace packing and the weight matrices for the rank 2 codebook may be generated using the weight vectors of the rank 1 codebook. The first column of each weight matrix of the rank 2 codebook may be generated with the first column of the unitary matrix generated using the weight vectors of the rank 1 codebook, and the second column of the weight matrix may be generated with the column selected from the other columns of the unitary matrix in the particular pattern.

The beamformer 406 generates a plurality of antenna signals by multiplying the data output from the modulator 404 by the beamforming weight (the weight vector or the weight matrix) output from the beamforming weight generator 416. The first antenna signal is applied to the subcarrier mapper 408-1 and the $N_t$-th antenna signal is applied to the subcarrier mapper 408-$N_t$.

The subcarrier mappers 408-1 through 408-$N_t$ each map a corresponding antenna signal output from the beamformer 406. The OFDM modulators 410-1 through 410-$N_t$ generates time-domain data by Inverse Fast Fourier Transform (IFFT)-processing the data output from a corresponding subcarrier mapper 408-1 through 408-$N_t$ and produces OFDM symbols by inserting a guard interval (e.g., cyclic prefix) to the time-domain data. The RF transmitters 412-1 through 412-$N_t$ convert the data output from a corresponding OFDM modulator 410-1 through 410-$N_t$ to an analog signal, convert the analog signal to an RF signal, and then transmit the RF signal over a corresponding antenna.

Figure 5:
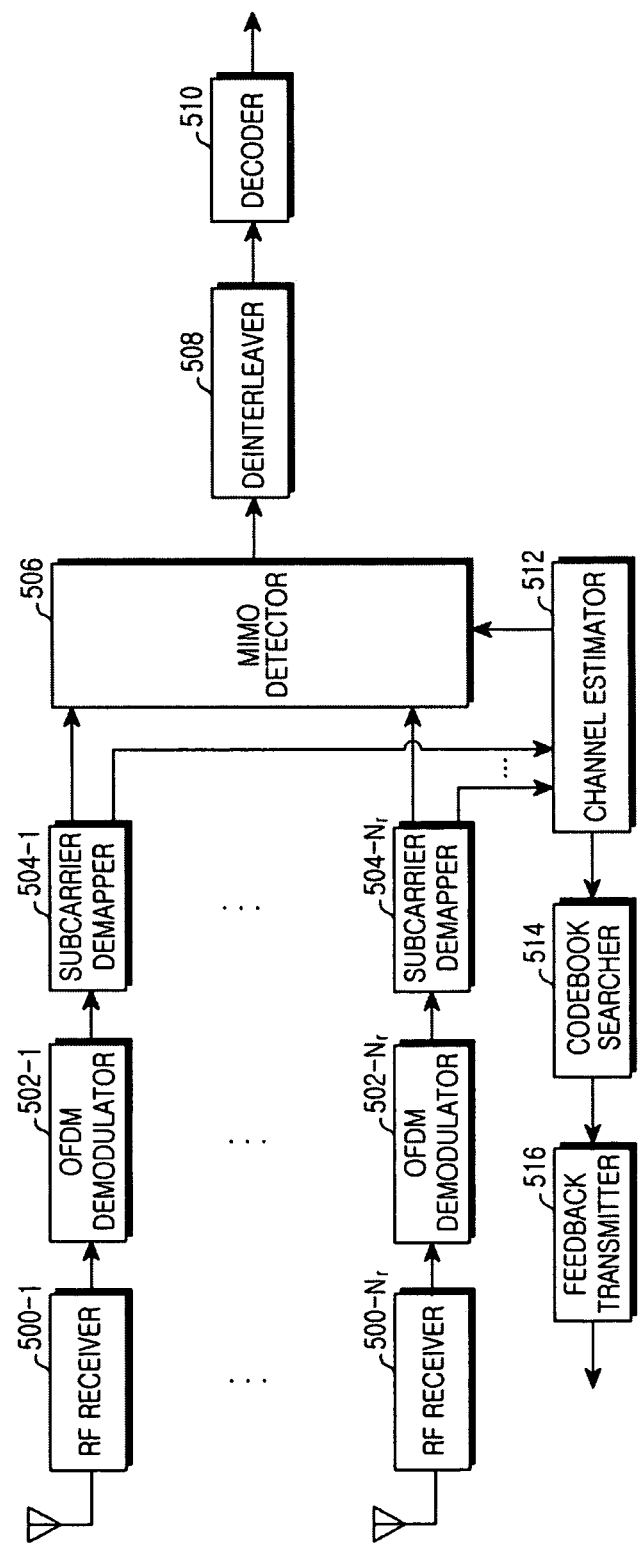
FIG. 5 is a block diagram illustrating a receiver in a codebook based CL-MIMO system according to an exemplary embodiment of the present invention.

FIG. 5 is a block diagram of a receiver in a codebook based CL-MIMO system according to an exemplary embodiment of the present invention. The receiver is a relative term and is assumed to be a terminal.

Referring to FIG. 5, the receiver includes a plurality of RF receivers 500-1 through 500-$N_r$, a plurality of OFDM demodulators 502-1 through 502-$N_r$, a plurality of subcarrier demappers 504-1 through 504-$N_r$, a MIMO detector 506, a deinterleaver 508, a decoder 510, a channel estimator 512, a codebook searcher 514 and a feedback transmitter 516.

The RF receivers 500-1 through 500-$N_r$ each convert the RF signal received over corresponding antennas to a baseband signal and convert the baseband analog signal to digital sample data. The OFDM demodulators 502-1 through 502-$N_r$ remove the guard interval from the sample data output from the RF receivers 500-1 through 500-$N_r$ and produce frequency-domain data by FFT-processing the sample data with the guard interval removed. The subcarrier demappers 504-1 through 504-$N_r$ extract the receive data from the data output from the OFDM demodulators 502-1 through 502-$N_r$ and provide the extracted receive data to the MIMO detector 506. The subcarrier demappers 504-1 through 504-$N_r$ extract a particular signal (e.g., pilot signal or preamble signal) for the channel estimation and provide the extracted signal to the channel estimator 512.

The MIMO detector 506 generates the receive vector with the data provided from the subcarrier demappers 504-1 through 504-$N_r$ and estimates the transmit symbols using the receive vector and the channel matrix output from the channel estimator 512. The MIMO detector 506 may adopt various well-known MIMO detection algorithms. Herein, it is assumed that the output of the MIMO detector 506 is Log Likelihood Ratio (LLR) data. The deinterleaver 508 deinterleaves the data output from the MIMO detector 506. The decoder 510 restores information data by decoding the data output from the deinterleaver 508.

The channel estimator 512 estimates channel coefficients using the pilot signals provided from the subcarrier demappers 504-1 through 504-$N_r$, generates a channel matrix with the channel coefficients and provides the channel matrix to the codebook searcher 514. The codebook searcher 514 includes the codebook, searches the codebook using the channel matrix output from the channel estimator 512, and provides the searched codebook index (including the rank index) to the feedback transmitter 516. Herein, it is assumed that the codebook includes the weights for the rank 1 codebook and the weights for the rank 2 codebook. For example, the weight vectors for the rank 1 may be generated using the Grassmannian subspace packing and the weight matrices for the rank 2 codebook may be generated using the weight vectors of the rank 1 codebook. The first column of each weight matrix of the rank 2 codebook may be generated with the first column (the weight vector of the rank 1 codebook) of the unitary matrix generated using the weight vectors of the rank 1 codebook, and the second column of the weight matrix may be generated with the column selected from the other columns of the unitary matrix in the particular pattern.

The feedback transmitter 516 generates the feedback message (or the channel signal) with the codebook index provided from the codebook searcher 514 and transmits the feedback message to the base station.

Figure 6:
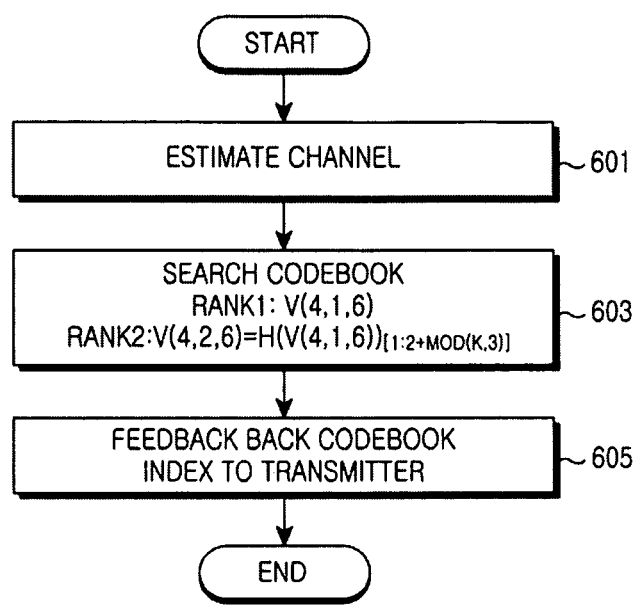
FIG. 6 is flowchart illustrating an operation process of a receiver in a codebook based CL-MIMO system according to an exemplary embodiment of the present invention.

FIG. 6 is a flowchart illustrating an operation process of a receiver in a codebook based CL-MIMO system according to an exemplary embodiment of the present invention.

Referring to FIG. 6, in step 601, the receiver estimates the channel coefficients using the specific signals (e.g., pilot signals or preamble signals) and generates the channel matrix between a transmitter and a receiver with the estimated channel coefficients.

In step 603, the receiver searches the codebook using the channel matrix. Herein, it is assumed that the number of transmit antennas $N_t$ is 4, the number of codebook index bits L is 6, and the codebook includes the weights for the rank 1 codebook and the rank 2 codebook. The codebooks for the rank 1 codebook and the rank 2 codebook are defined as below:

rank 1 codebook: V(4, 1, 6)
rank 2 codebook: V(4, 2, 6)=H(V(4, 1, 6))$_{[1:2+mod(k,3)]}$ H(v) denotes a function of generating the unitary matrix with the input vector v and the subscript in H( ) denotes the column selection pattern for the result of the function.

As described above, the matrix of the rank 2 codebook includes the first column (vector) of the matrix generated using the vectors of the rank 1 codebook and another column selected in the particular pattern. The particular pattern may be the round-robin manner according to a modulo operation, or select the column of a particular number (e.g., the second column).

That is, in step 603, the receiver searches the codebook for the rank 1 and then searches the codebook for the rank 2, and determines the codebook index (including the rank index) corresponding to the current channel. Since the computation of the first column of the rank 2 codebook may utilize the value of the rank 1 codebook search, the computation may be reduced.

In step 605, the receiver generates the feedback message with the determined codebook index and feeds back the feedback message to the transmitter.

Figure 7:
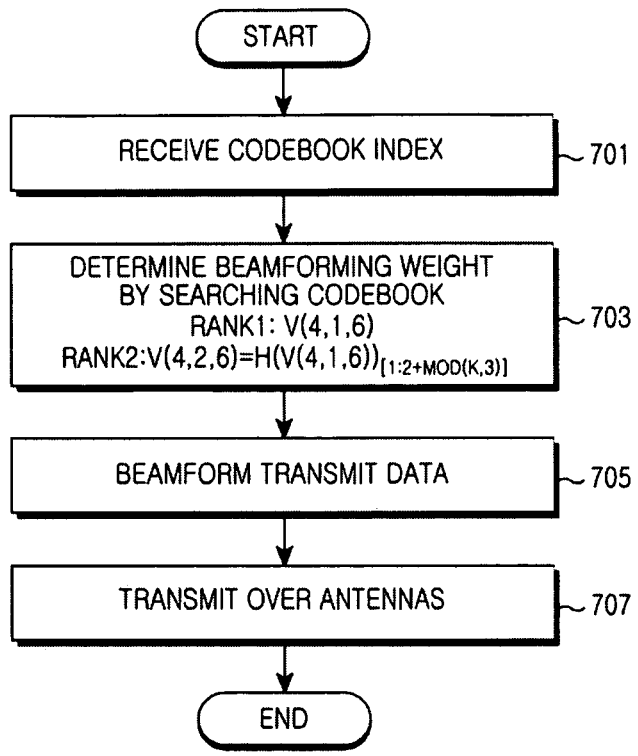
FIG. 7 is flowchart illustrating an operation process of a transmitter in a codebook based CL-MIMO system according to an exemplary embodiment of the present invention.

FIG. 7 is a flowchart illustrating an operation process of a transmitter in a codebook based CL-MIMO system according to an exemplary embodiment of the present invention.

Referring to FIG. 7, in step 701, the transmitter receives the codebook index from the receiver. Upon receiving the codebook index, the transmitter searches the codebook with the codebook index and determines the beamforming weight (the weight vector or the weight matrix) corresponding to the codebook index in step 703.

Herein, it is assumed that the number of transmit antennas $N_t$ is 4, the number of codebook index bits L is 6, and the codebook includes the weights for the rank 1 codebook and the rank 2 codebook. The codebooks for the rank 1 and the rank 2 are defined as below:

rank 1 codebook: V(4, 1, 6)
rank 2 codebook: V(4, 2, 6)=H(V(4, 1, 6))$_{[1:2+mod(k,3)]}$ H(v) denotes a function of generating the unitary matrix with the input vector v and the subscript in H( ) denotes the column selection pattern for a result of the function.

As described above, the matrix of the rank 2 codebook includes the first column (vector) of the matrix generated using the vectors of the rank 1 codebook and another column selected in the particular pattern. The particular pattern may be the round-robin manner according to the modulo operation, or select the column (e.g., the second column) of a particular number.

In step 705, the transmitter beamforms the transmit data with the determined beamforming weight. In step 707, the transmitter transmits the beamformed data over the plurality of the antennas.

While the codebook V(4, 2, 6) has been mainly illustrated, an exemplary embodiment of the present invention may be extended according to the number of transmit antennas, the number of streams, and the number of codebook index bits. For example, the codebook V(4, 2, 3) may be also generated according to an exemplary embodiment of the present invention. In this case, the codebooks for the rank 1 and the rank 2 are defined as below:

rank 1 codebook: V(4, 1, 3)
rank 2 codebook: V(4, 2, 3)=H(V(4, 1, 3))$_{[1:2]}$

H(v) denotes a unitary matrix generation function and the subscript in H( ) denotes the column selection pattern.

As stated above, the matrix of the rank 2 codebook is generated with the first column (vector) of the unitary matrix generated with the vectors of the rank 1 codebook and the column of a specific number (the second). Likewise, since the computation value in the rank 1 codebook search is utilized in the first column computation of the rank 2 codebook for the codebook search, the computation of the terminal may be reduced.

Since the first column of the rank 2 codebook matrix is generated with the codebook vectors of the rank 1 codebook, the computation in the codebook search may be reduced. That is, because the value in the rank 1 codebook search is utilized as it is in the computation for the first column of the rank 2 codebook matrix, the codebook search computation of the terminal may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for generating a codebook in a Closed-Loop (CL)-Multiple Input Multiple Output (MIMO) system, the method comprising:
   determining weight vectors $v_i$ (i=1, . . . , $2^L$), using a processor, for a codebook V(4, 1, L), where $N_t$ of a codebook V($N_t$, s, L) denotes a number of antennas, s denotes a number of streams, and L denotes a number of codebook index bits;
   determining a unitary matrix $T_i$ using an i-th vector $v_i$ of the codebook V(4, 1, L); and
   determining an i-th weight matrix of a codebook V(4, 2, L) by selecting a first column of the unitary matrix $T_i$ as a first column of the weight matrix and selecting a column selected from other columns, excluding the first column of the unitary matrix $T_i$ in a particular pattern, as a second column of the weight matrix.

2. The method of claim 1, wherein the first column of the unitary matrix $T_i$ is equal to the i-th vector $v_i$ of the codebook V(4, 1, L).

3. The method of claim 1, wherein the particular pattern comprises one of a round-robin manner and a manner which selects a column of a particular number.

4. The method of claim 1, wherein the codebook V(4, 1, L) and the codebook V(4, 2, L) comprises one of the following relations:

$V(4,2,L)=H(V(4,1,L))_{[1;f(i)=2+i\ mod(Nt-1)]}$, for (i=1, . . . , $2^L$)

$V(4,2,L)=H(V(4,1,L))_{1:2}$, $V(4,2,L)=H(V(4,1,L))_{1:3}$, and $V(4,2,L)=H(V(4,1,L))_{1:4}$ where H(v) denotes a function of generating a unitary matrix with an input vector v and a subscript of H( ) indicates a column selection pattern for a result of the function, and wherein $N_t \geq 2$.

5. The method of claim 1, wherein the number of the codebook index bits L is 3 for a codebook V(4, 1, 3) and a codebook V(4, 2, 3) with the following relation:

$V(4,2,3)=H(V(4,1,3))_{1:2}$ where H(v) denotes a function of generating a unitary matrix with an input vector v and a subscript of H( ) indicates a column selection pattern for a result of the function.

6. An apparatus for a transmission in a codebook based Closed-Loop (CL)-Multiple Input Multiple Output (MIMO) system, the apparatus comprising:
   a feedback receiver configured to receive a codebook index from a receiver;
   a weight generator configured to search a codebook with the codebook index and generating a beamforming weight corresponding to the codebook index;
   a beamformer configured to generate data beamformed by multiplying transmit data by the beamforming weight; and
   a transmitter configured to transmit the data beamformed at the beamformer over a plurality of antennas,
   wherein the codebook comprises weight vectors for a codebook V(4, 1, L) and weight matrices for a codebook V(4, 2, L), where $N_i$ of a codebook V($N_i$, s, L) denotes a number of antennas, s denotes a number of streams, L denotes a number of codebook index bits, and V(4, 2, L)=H(V(4, 1, L))$_{1:2}$, where H(v) denotes a function of generating a unitary matrix with an input vector v and a subscript of H( ) indicates a column selection pattern for a result of the function.

7. The apparatus of claim 6, wherein the number of the codebook index bits L is 3 for a codebook V(4, 1, 3) and a codebook V(4, 2, 3) with the following relation:

$V(4,2,3)=H(V(4,1,3))_{1:2}$.

8. An apparatus for a reception in a codebook based Closed-Loop (CL)-Multiple Input Multiple Output (MIMO) system, the apparatus comprising:
   a channel estimator configured to estimate a channel between a transmitting end and a receiving end;
   a searcher configured to search a codebook using a channel estimate value output from the channel estimator and issuing a searched codebook index; and
   a feedback transmitter configured to generate a feedback signal with the codebook index output from the searcher and transmitting the feedback signal to a transmitter,
   wherein the codebook comprises weight vectors for a codebook V(4, 1, L) and weight matrices for a codebook V(4, 2, L), where $N_t$ of a codebook V($N_t$, s, L) denotes a number of antennas, s denotes a number of streams, and L denotes a number of codebook index bits, and V(4, 2, L)=H(V(4, 1, L))$_{1:2}$, where H(v) denotes a function of generating a unitary matrix with an input vector v and a subscript of H( ) indicates a column selection pattern for a result of the function.

9. The apparatus of claim 8, wherein the number of the codebook index bits L is 3 for a codebook V(4, 1, 3) and a codebook V(4, 2, 3) with the following relation:

$V(4,2,3)=H(V(4,1,3))_{1:2}$.

10. The apparatus of claim 8, wherein the searcher searches a codebook for a stream 2 using a computation value produced in a codebook search for a stream 1.

11. An operating method of a transmitter in a codebook based Closed-Loop (CL)-Multiple Input Multiple Output (MIMO) system, the method comprising:

receiving a codebook index from a receiver;
searching a codebook with the codebook index;
determining a beamforming weight corresponding to the searched codebook index;
generating data beamformed by multiplying transmit data by the beamforming weight at the transmitter; and
transmitting the data beamformed at the beamformer over a plurality of antennas,
wherein the codebook comprises weight vectors for a codebook V(4, 1, L) and weight matrices for a codebook V(4, 2, L), where $N_t$ of a codebook V($N_t$, s, L) denotes a number of antennas, s denotes a number of streams, and L denotes a number of codebook index bits, and V(4, 2, L)=H(V(4, 1, L))$_{1:2}$, where H(v) denotes a function of generating a unitary matrix with an input vector v and a subscript of H( ) indicates a column selection pattern for a result of the function.

12. The operating method of claim 11, wherein the number of the codebook index bits L is 3 for a codebook V(4, 1, 3) and a codebook V(4, 2, 3) with the following relation:

$$V(4,2,3)=H(V(4,1,3))_{1:2}.$$

13. An operating method of a receiver in a codebook based Closed-Loop (CL)-Multiple Input Multiple Output (MIMO) system, the method comprising:

estimating a channel between a transmitting end and a receiving end to obtain a channel estimate value;
determining a codebook index by searching a codebook using the channel estimate value;
generating a feedback signal with the determined codebook index; and
transmitting the feedback signal to a transmitter,
wherein the codebook comprises weight vectors for a codebook V(4, 1, L) and weight matrices for a codebook V(4, 2, L), where $N_t$ of a codebook V($N_t$, s, L) denotes a number of antennas, s denotes a number of streams, and L denotes a number of codebook index bits, and V(4, 2, L)=H(V(4, 1, L))$_{1:2}$, where H(v) denotes a function of generating a unitary matrix with an input vector v and a subscript of H( ) indicates a column selection pattern for a result of the function.

14. The operating method of claim 13, wherein the number of the codebook index bits L is 3 for a codebook V(4, 1, 3) and a codebook V(4, 2, 3) with the following relation:

$$V(4,2,3)=H(V(4,1,3))_{1:2}.$$

15. The operating method of claim 13, wherein the determining of the codebook index comprises searching a codebook for a stream 2 using a computation value produced in a codebook search for a stream 1.

* * * * *